United States Patent [19]

Sakai et al.

[11] Patent Number: 5,121,328
[45] Date of Patent: Jun. 9, 1992

[54] FEE CALCULATING APPARATUS FOR CALCULATING DELIVERY FEE OF PARCEL IN ACCORDANCE WITH ITS WEIGHT, LENGTH, AND DELIVERY AREA

[75] Inventors: Tohru Sakai, Fussa; Hanzou Tsuzuki, Oome; Tutomu Yamaguchi, Higashiyamato, all of Japan

[73] Assignee: Casio Computer Co., Ltd., Tokyo, Japan

[21] Appl. No.: 464,413

[22] Filed: Jan. 12, 1990

[30] Foreign Application Priority Data

Jan. 31, 1989 [JP] Japan ................................. 1-19916
Apr. 20, 1989 [JP] Japan ................................. 1-98760

[51] Int. Cl.$^5$ ............................................. G07B 17/02
[52] U.S. Cl. ............................. 364/464.03; 33/712; 177/4; 177/25.15; 364/464.02
[58] Field of Search ................... 33/712; 177/4, 25.15; 364/464.02, 464.03

[56] References Cited

U.S. PATENT DOCUMENTS

| | | | |
|---|---|---|---|
| 2,688,878 | 9/1954 | Kolisch | 364/466 X |
| 2,689,082 | 9/1954 | Kolisch | 364/466 X |
| 2,708,368 | 5/1955 | Kolisch | 364/466 X |
| 2,812,904 | 11/1957 | Kolisch | 364/466 X |
| 3,436,968 | 4/1969 | Unger et al. | 364/466 X |
| 4,420,819 | 12/1983 | Price et al. | 364/464.03 X |
| 4,511,793 | 4/1985 | Racanelli | 364/464.03 |
| 4,628,457 | 12/1986 | Manduley | 364/464.03 |
| 4,718,507 | 1/1988 | Howlett et al. | 177/229 X |
| 4,829,443 | 5/1989 | Pintsov et al. | 364/464.03 |

*Primary Examiner*—Parshotam S. Lall
*Assistant Examiner*—Edward R. Cosimano
*Attorney, Agent, or Firm*—Frishauf, Holtz, Goodman & Woodward

[57] ABSTRACT

In a fee calculating apparatus for calculating a delivery fee, when weight data obtained by measurement in a weight measuring section such as an electronic scale, length data obtained by measurement in a length measuring section such as an automatic measure. and area data input by area data input means are all supplied to the calculating means, a delivery fee is calculated from the data by the calculating means in accordance with fee tables such as a parcel rank conversion table and a fee conversion table.

7 Claims, 12 Drawing Sheets

LENGTH →

| 1 | 2 | 3 | 4 | 5 |
|---|---|---|---|---|
| 2 | 3 | 4 | 5 | 6 |
| 3 | 4 | 5 | 6 | 7 |
| 4 | 5 | 6 | 7 | 8 |
| 5 | 6 | 7 | 8 | 9 |

WEIGHT ↓

42-1

PARCEL RANK TABLE

FIG. 4

AREA

FEE RANK ↓

42-2

FEE CONVERSION TABLE

FIG. 5

TOTALIZATION MEMORY

| | CHARACTER | QUANTITY | NET SALES |
|---|---|---|---|
| AREA NAME 1 | | | |
| AREA NAME 2 | | | |
| ⋮ | ⋮ | ⋮ | ⋮ |
| AREA NAME 28 | | | |

FEE CALCULATING APPARATUS FOR CALCULATING DELIVERY FEE OF PARCEL IN ACCORDANCE WITH ITS WEIGHT, LENGTH, AND DELIVERY AREA

BACKGROUND OF THE INVENTION

1. Field of the Invention

The present invention relates to a fee calculating apparatus for calculating the delivery fee of a parcel in accordance with its weight, length, and delivery area.

2. Description of the Related Art

Conventionally, a shop which deals with home delivery or the like is equipped with a weighing instrument for measuring the weight of a parcel, an instrument for measuring its length, and a fee conversion table listing delivery fees for the respective delivery areas. A worker refers to the conversion table so as to obtain a delivery fee based on the weight measured by the weighing instrument, the length (size) measured by the measuring instrument, and the delivery area.

In the above-described method, since all operations for calculating a delivery fee must be manually performed, the operating efficiency is low. In addition, troubles tend to occur. That is, this method lacks efficiency.

Under the circumstances, a sequence of operations for calculating a delivery fee may be automated. However, this involves the usage of equipment which is large and cumbersome, with the result that it is difficult to operate. For these reasons, automation of delivery fee calculation has not yet been realized.

SUMMARY OF THE INVENTION

It is an object of the present invention to provide a fee calculating apparatus which can automatically perform a sequence of operations for calculating a delivery fee.

According to the present invention, there is provided a fee calculating apparatus for calculating the delivery fee of a parcel in accordance with its weight, length, and delivery area, comprising:

a weight measuring section for measuring the weight of the parcel;

a length measuring section for measuring the length of the parcel;

area data input means for inputting area data representing the delivery area of the parcel;

a fee table for storing delivery fees corresponding to weights, lengths, and areas; and calculating means for, when weight data obtained by measurement in the weight measuring section, length data obtained by measurement in the length measuring section, and the area data input by the area data input means are all received, obtaining the delivery fee from the fee table by using the received data.

Since the fee calculating apparatus of the present invention has the above-described arrangement, a sequence of operations for calculating a delivery fee can be automatically performed, thereby increasing the efficiency of, and ensuring the accuracy of, delivery fee calculations.

BRIEF DESCRIPTION OF THE DRAWINGS

FIG. 4 is a view showing the format of a parcel fee rank conversion table of the fee calculating apparatus according to the first embodiment;

FIG. 5 is a view showing the format of a fee conversion table of the fee calculating apparatus according to the first embodiment;

FIG. 6 is a view showing the format of a totalization memory of the fee calculating apparatus according to the first embodiment;

DETAILED DESCRIPTION OF THE PREFERRED EMBODIMENTS

A fee calculating apparatus according to the first embodiment of the present invention will be described below, with reference to the accompanying drawings.

Figure 1:
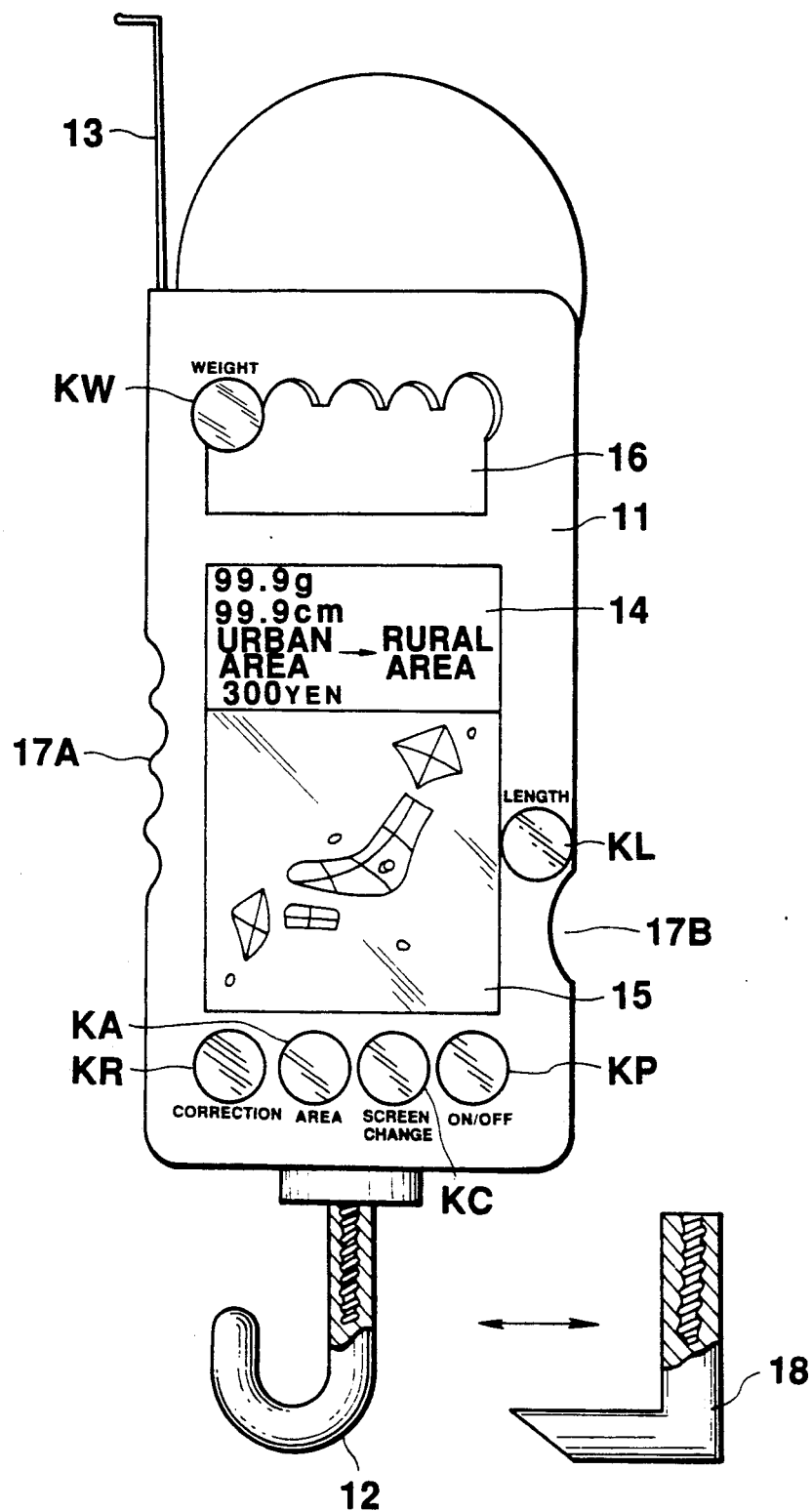
FIG. 1 is a view showing the outer appearance of a fee calculating apparatus according to the first embodiment of the present invention.

FIG. 1 is a view showing an outer appearance of the fee calculating apparatus.

This fee calculating apparatus is a handy type electronic apparatus including batteries and having an elongated box-like shape. A hook 12 constituting a spring scale is exchangeably mounted on the lower end portion of the body 11 of this apparatus. A scale 13, constituting an automatic measuring section, is installed in the upper portion of the body 11 so as to be extractable and retractable. In addition, a data display portion 14 and a touch-input display portion 15 are arranged on the upper surface of the body 11.

The data display portion 14 is a liquid crystal display unit for displaying weight and length data obtained by measurement, a calculated delivery fee, and the like. The touch-input display portion 15 is a liquid crystal display unit, having transparent touch keys, for displaying a map when a delivery area is designated by a touch-input operation and for displaying the names of various touch key functions as symbols. The display contents of the screen of the touch-input display portion 15 are changed by operating a screen change key KC arranged on the upper surface of the body 11.

Various push button type stroke keys are arranged on the upper surface of the body 11. In addition to the screen change key KC, they are: a power ON/OFF key KP; a weight designation key KW for designating input of weight data; a length designation key KL for designating input of length data; an area designation key KA for designating input of delivery area data; and a "0"

correction key KR. In this case, the weight and length designation keys KW and KL are positioned such that when an operator holds the body 11 with his hand during measurement of weight or length, each key can be easily operated by the hand with which the body 11 is held. More specifically, when the weight is to be measured, the operator's hand is inserted in a grip hollow portion 16 which is formed in the upper portion of the body 11 so as to facilitate measurement of the weight of a relatively heavy parcel, and the body 11 is suspended from the hand. For this reason, the weight designation key KW is arranged near the grip hollow portion 16. In addition, when the length is to be measured, the body 11 is held by the operator with his fingers hooked on grip portions 17A and 17B formed on both side surfaces of the body 11, therefore the length designation key KL is arranged near the grip portion 17B.

In this fee calculating apparatus, the hook 12 can be exchanged with an L-shaped hook 18 shown in FIG. 1, in accordance with the shape or the like of a parcel in measurement of weight.

Figure 2:
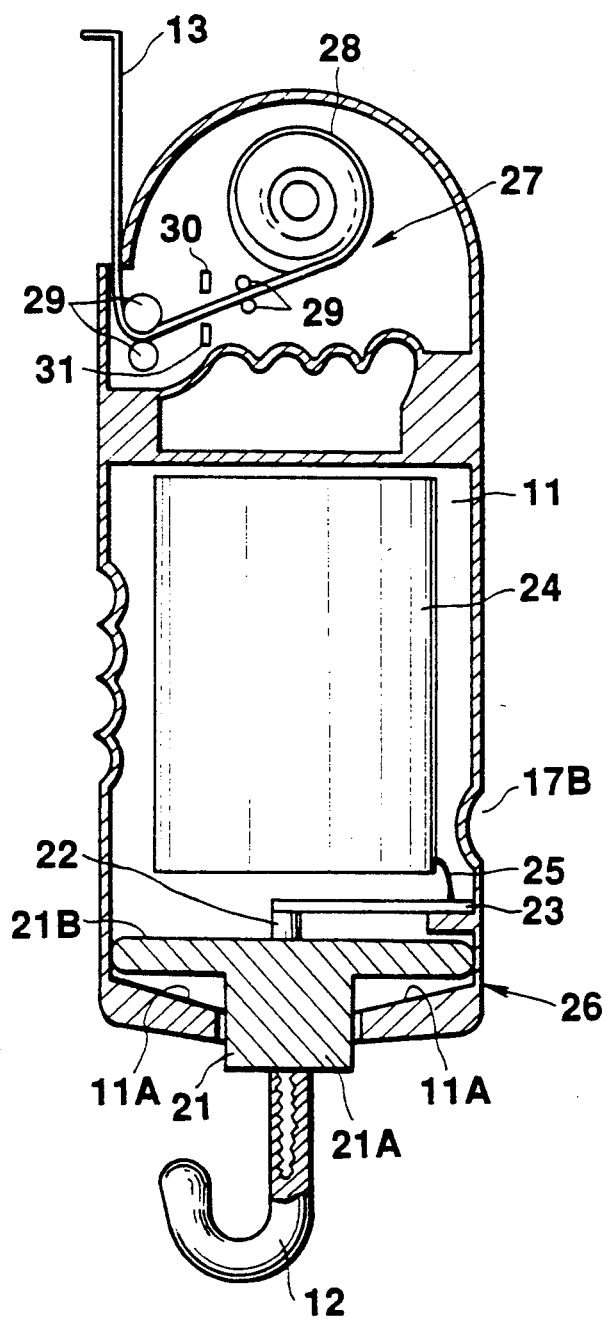
FIG. 2 is a longitudinal sectional view of the fee calculating apparatus in FIG. 1.

FIG. 2 is a sectional view of the fee calculating apparatus.

A hook support member 21, having a T-shaped section, is housed in the lower portion 26 of the body 11. An axial portion 21A of the member 21 protrudes from the lower end opening of the body 11, and the hook 12 is attached to the lower surface of the axial portion 21A. A collar portion 21B of the hook support member 21 is mounted on a tapered surface 11A formed on the bottom plate portion of the body 11. Upon exertion of a load, the collar portion 21B is distorted along the tapered surface 11A so as to transmit the load to a load cell 23 which is fixed to the central portion of the upper surface of the collar portion 21B through a receiving portion 22. Note that the load cell 23 is connected to a circuit board 24 through a lead 25. The above-described arrangement constitutes a weight measuring section for measuring the weight of a parcel.

A length measuring section 27 for measuring the length of a parcel (to be referred to as an automatic measure section hereinafter) comprises a take-up mechanism 28 for taking up the scale 13, guide rollers 29 for guiding the scale 13 in a predetermined direction, and light-emitting and light-receiving elements 30 and 31 for optically detecting a protrusion amount of the scale 13.

Figure 3:
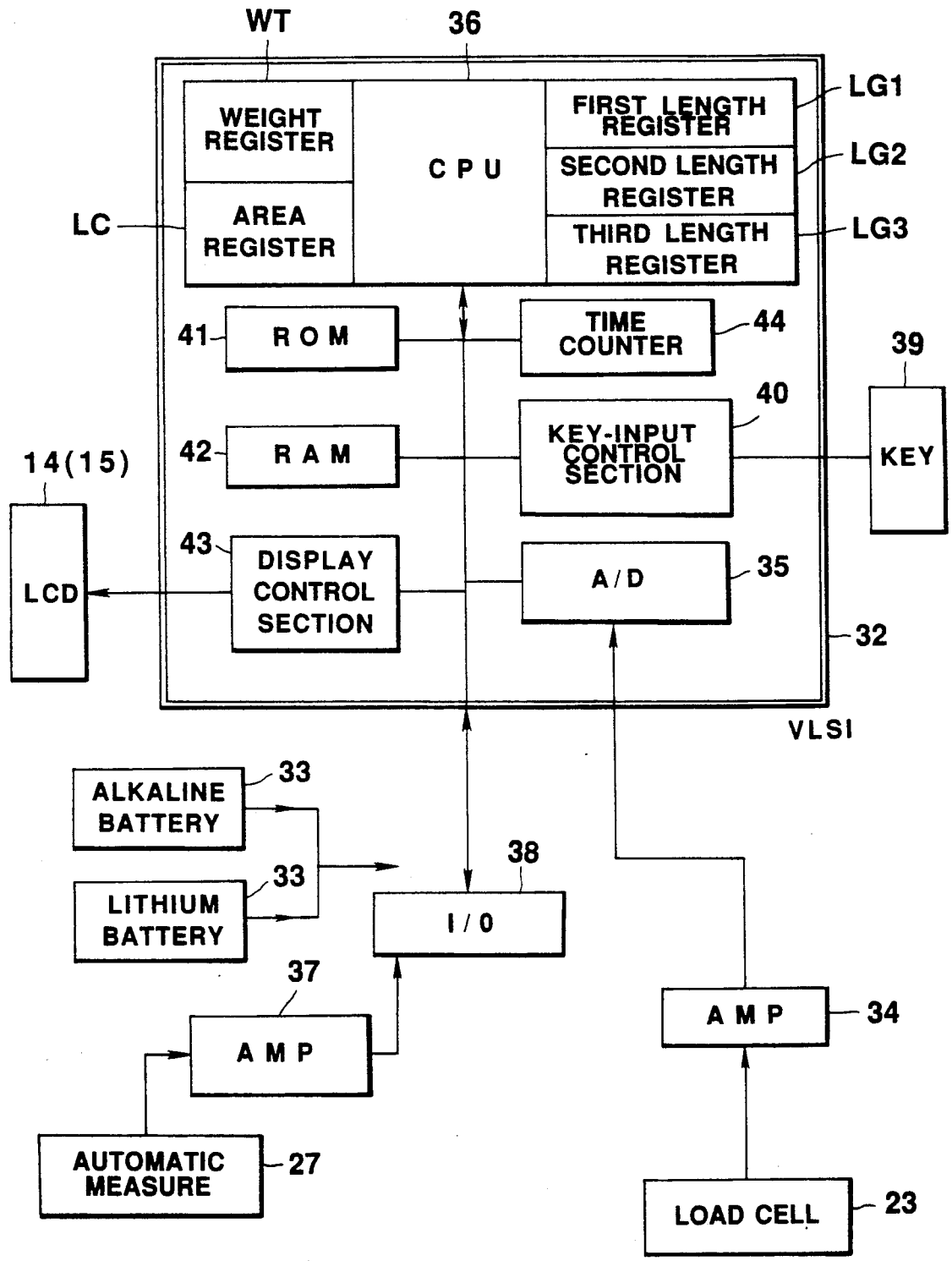
FIG. 3 is a block diagram of the fee calculating apparatus according to the first embodiment.

FIG. 3 is a block diagram of the fee calculating apparatus.

The fee calculating apparatus incorporates a one-chip LSI (large scale integrated circuit) 32. Batteries (lithium and alkaline batteries) 33 are used as a power supply so as to allow the apparatus to be carried to any place.

The output voltage (weight measuring voltage) from the load cell 23 is amplified by an amplifier 34. The amplified voltage is converted into a digital value by an A/D converter 35 in the one-chip LSI 32 and is then input to a CPU 36.

A signal corresponding to the length measured by the automatic measure section 27 is amplified by an amplifier 37 and is received by an input/output (I/O) circuit 38. The signal is then converted into a digital value and received by the CPU 36.

A key-input signal input from a key-input section 39 is converted into a key code by a key-input control section 40 in the one-chip LSI 32, and is then supplied to the CPU 36.

The CPU 36 controls various operations of the fee calculating apparatus according to microprograms stored in a ROM 41. The CPU 36 incorporates a weight register WT, an area register LC, and three types of length registers LG1, LG2, and LG3. In this case, the weight register WT is a register for temporarily storing weight data obtained by measurement; the area register LC, for temporarily storing area data designated/input by the key-input section 39; and the length registers LG1, LG2, and LG3, for temporarily storing length data obtained by measurement in the automatic measure section 27, more specifically, for sequentially storing the lengths of three sides (height, width, and length) of a parcel which are measured by the automatic measure section 27 beforehand. The CPU 36 calculates a delivery fee by reading out data from the weight register WT, the area register LC, and the length registers LG1, LG2, and LG3, and by referring to various tables in a RAM 42. Thereafter, the CPU 36 supplies the calculation result to a display control section 43 so as to display it on the data display portion 14.

Note that a time counter 44 is arranged in the fee calculating apparatus. The CPU 36 supplies date/time data obtained by the time counter 44 to the display control section 42 so as to display it on the data display portion 14, thereby allowing confirmation of delivery date and time.

FIG. 4 shows the format of a parcel rank conversion table 42-1 stored in the RAM 42. The parcel rank conversion table 42-1 is used to obtain a parcel rank used for fee calculation in accordance with weight (units $b_1 \ldots b_5$) and length (units $a_1 \ldots a_5$) measurement values.

FIG. 5 shows the format of a fee conversion table 42-2 stored in the RAM 42. The fee conversion table 42-2 is used to calculate a delivery fee on the basis of a rank obtained by conversion using a parcel rank obtained from parcel rank conversion table 42-1 and a designated/input delivery area from among areas A, B, C . . .

FIG. 6 shows the format of a totalization memory 42-3 arranged in the RAM 42. The totalization memory 42-3 is designed to store characters (area name), a quantity, and net sales for each area.

An operation of the fee calculating apparatus according to the first embodiment will be described below with reference to FIGS. 7A and 7B.

Figure 7:
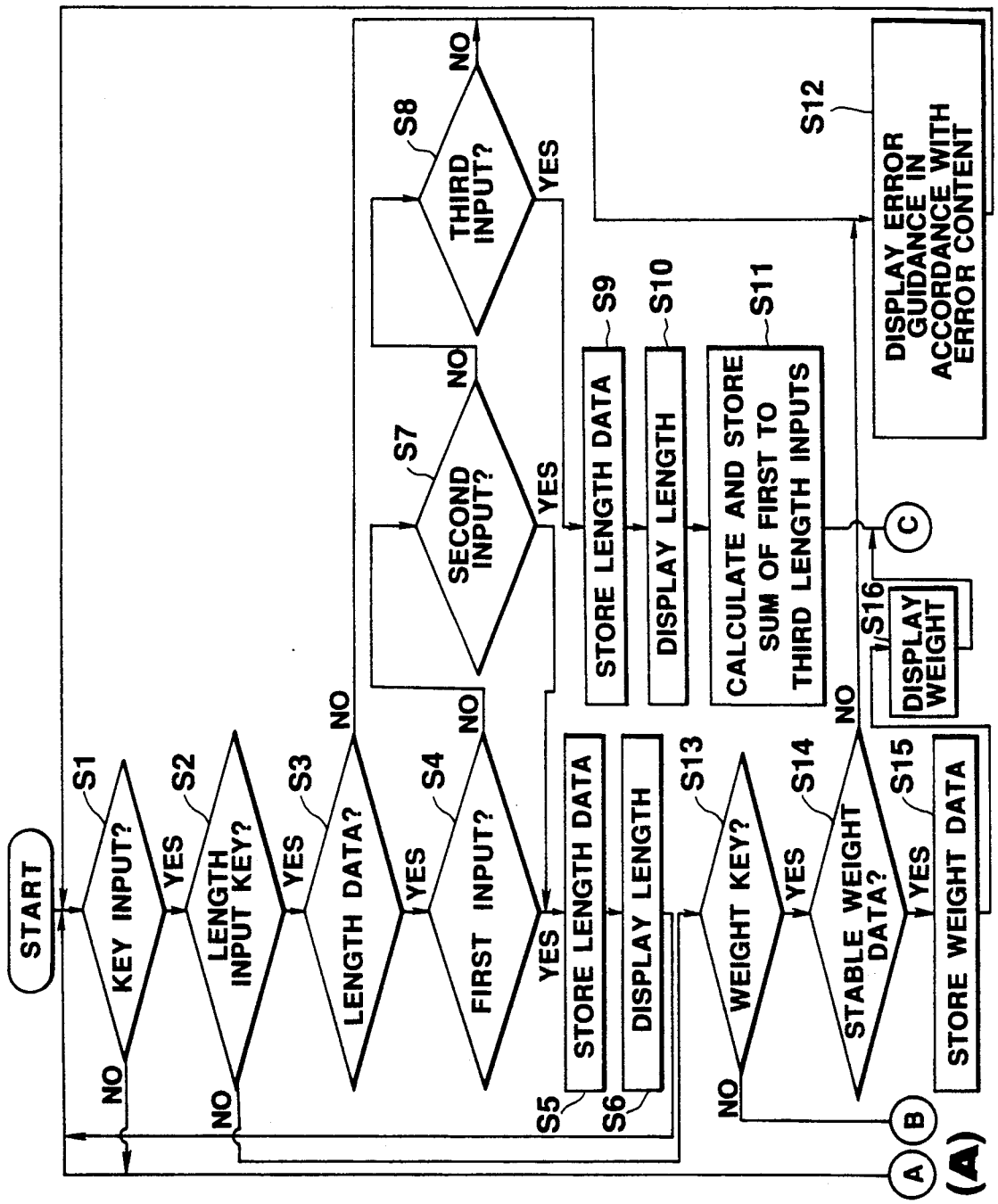
FIGS. 7A and 7B are flow charts showing an operation of the overall fee calculating apparatus according to the first embodiment.
Figure 7B:
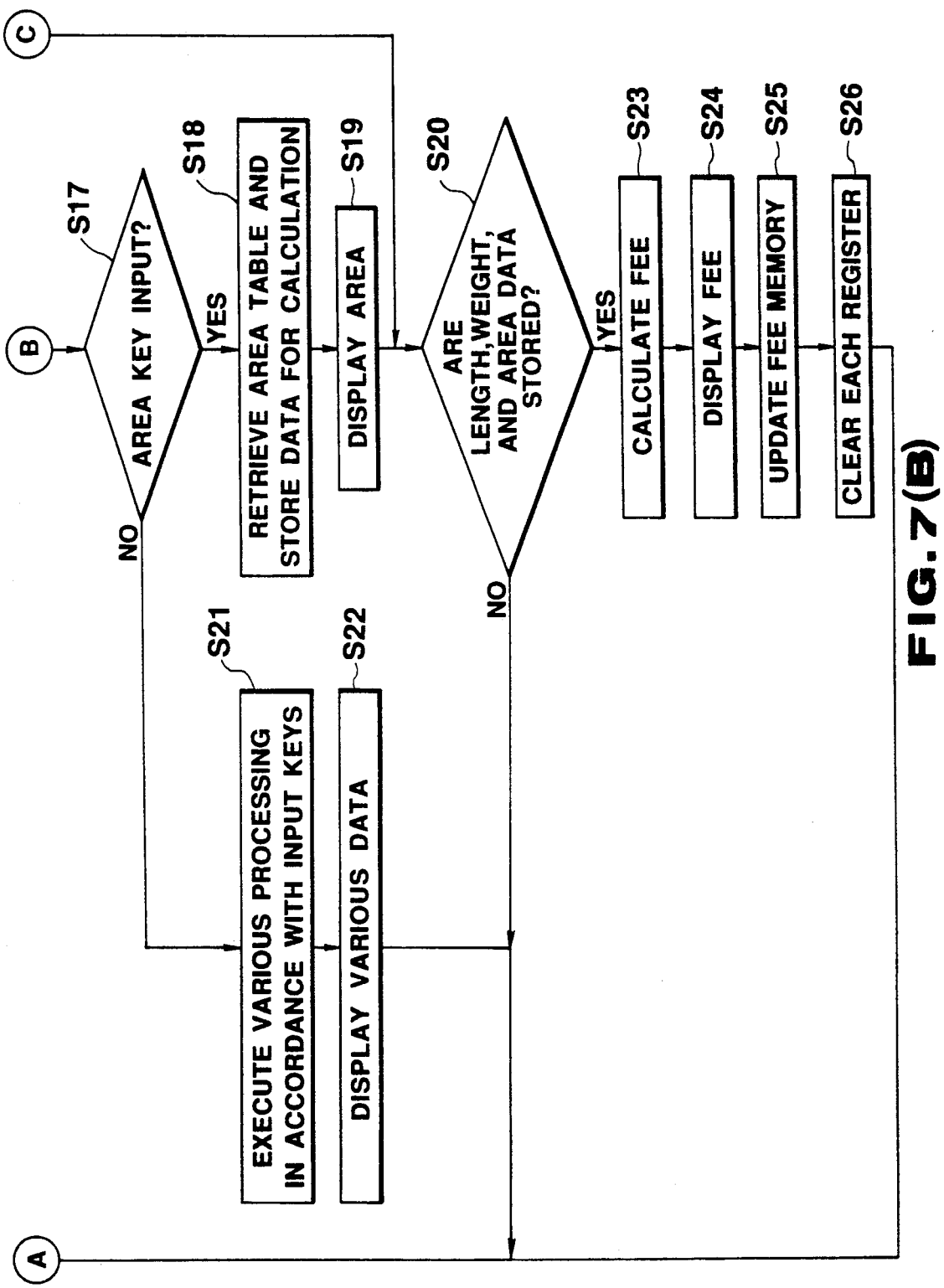

FIGS. 7A and 7B are flow charts showing an operation of the overall fee calculating apparatus.

Step S1 checks whether or not there is any key input from keys KW (weight designation), KL (length designation), or KA (area designation).

When an operator holds the body 11 with his hand and pulls out the scale 13 in order to measure the length of a parcel, the automatic measure section 27 registers a length corresponding to the amount of the scale 13 protruding from the body 11. The detection output is received by the CPU 36 through the amplifier 37 and the I/O circuit 38. In this manner, the operator measures the length of the parcel by using the automatic measure section 27. In this case, measurement of length is performed by measuring three sides of the parcel, i.e., the height, width, and length of the parcel. In step S1, the operator operates the length designation key KL for every measurement of length and step S1 determines whether any of keys KW, KL or KA has been operated. If so, a YES is generated in step S1 which leads to step S2. In step S2, if this operation of key KL is detected, the flow advances to step S3 based on a YES in step S2 so as to check the presence/absence of length data input. If only the length designation key KL is operated without measuring the length of the parcel, an error symbol is displayed to indicate that the measurement was not performed (step S12). If length data input is detected, the number of input operations is checked (steps S4, S7, and S8). If the first input is detected (step S4), the corresponding length data is stored in the length register LG1 per step S5. If step S4 generates a NO output and the second input is detected (step S7), the corresponding data is stored in the length register LG2 per step S5. If step S7 generates a NO and the third input is detected (step S8), the corresponding length data is stored in the length register LG3 per step S9. At the same time, the length data is supplied to the data display portion 14 to be displayed per step S6 or step S10.

When the three sides of the parcel are measured, and the measurement values are respectively set in the length registers LG1, LG2, and LG3 in this manner, the sum of the three sides is calculated on the basis of the measurement values (the volume of the parcel is calculated), and the calculation result is stored in the RAM 42 (step S11).

Note that if length data are input four times or more (NO in step S8), an error symbol is displayed in accordance with the error content (step S12).

When the weight of the parcel is to be measured, the parcel is hooked on the hook 12, and the operator inserts his hand in the grip hollow portion 16 to lift the body 11. Consequently, a load is applied to the hook support member 21, and the collar portion 21B is distorted to transmit the load to the load cell 23. As a result, a voltage corresponding to the weight of the parcel is output from the load cell 23 and is amplified by the amplifier 34. The amplified voltage is applied to the A/D converter 35 so as to be converted into digital weight data. The digital weight data is then supplied to the CPU 36. In this case, the CPU 36 writes the weight data in the weight register WT (step S15) and causes the data display portion 14 to display the data (step S16), provided that the weight designation key KW is operated, resulting in a NO output (step S2), a YES output (step S13) and a stable weight measurement value is obtained resulting in another YES output (step S14). Note that if stable weight data is not obtained when the weight designation key KW is operated, step S14 generates a NO, and an error symbol is displayed to indicate this error (step S12).

In order to designate a delivery area, the operator touches a position corresponding to an area to be designated on a Japanese map displayed on the touch-input display portion 15, and operates the area designation key KA. Since step S2 produces a NO in this case, it leads to step S13 which also produces a NO thereby causing step S17 to be reached. In step S17, this operation is detected to produce a YES output, and the operation advances to step S18 to retrieve an area table (not shown) in the RAM 42 in accordance with the key code which is input by touch, and to store area data corresponding to the key code in the area register LC. Subsequently, the area data is displayed on the data display portion 14 (step S19).

The operation then advances to step S20 to check whether predetermined data are respectively stored in the weight register WT, the area register LC, and the length registers LG1, LG2, and LG3, i.e., whether all the data required to calculate a delivery fee are obtained. If step S20 produces a NO output, the flow keeps returning to step S1 until all the data is obtained.

Note that if keys other than the above-described length, weight, and area designation keys KL, KW, and KA are operated, then step S17 will generate a NO. In such a case various processings corresponding to the input keys are executed (step S21), and the processing results are displayed on the data display portion 14 (step S22). For example, the screen change key KC is operated to change the display contents of the touch-input display portion 15, and a ten-key or an extra charge key is operated to input an extra charge.

When all the weight, length, and area data required to obtain a delivery fee are input/stored in the above-described manner, YES is indicated in step S20, and the operation advances to step S23 to calculate a delivery fee.

In this case, the delivery fee is calculated by referring to the parcel rank conversion table 42-1 and the fee conversion table 42-2. More specifically, retrieval of the parcel rank conversion table 42-1 is performed on the basis of the weight data in the weight register WT and the length data (the sum of the three sides) in the RAM 42 so as to obtain a parcel rank based on the weight and length (size) of the parcel. Retrieval of the fee conversion table 42-2 is then performed on the basis of this parcel rank and the area data in the area register LC so as to obtain the delivery fee. Since a delivery fee is obtained by referring to the tables in this manner, calculation can be easily performed, as compared with a calculation method using formulae.

When the delivery fee is calculated in this manner, the calculated fee is displayed on the data display portion 14 (step S24). The totalization memory 42-3 is retrieved on the basis of the area data, and the quantity and net sales of the corresponding area name in the totalization memory 42-3 are updated (step S25). Note that this sales data is used later to examine sales tendencies and the like. The respective registers in the CPU 36 are cleared (step S26). The flow returns to step S1, and the same operation as described above is repeated. If step S1 does not detect a key input, then it produces a NO output which also clears the registers in CPU 36 (step S26).

By arranging the respective components in a single apparatus as in this embodiment, a compact, portable fee calculating apparatus can be realized.

A fee calculating apparatus according to the second embodiment of the present invention will be described below with reference to the accompanying drawings.

Figure 8:
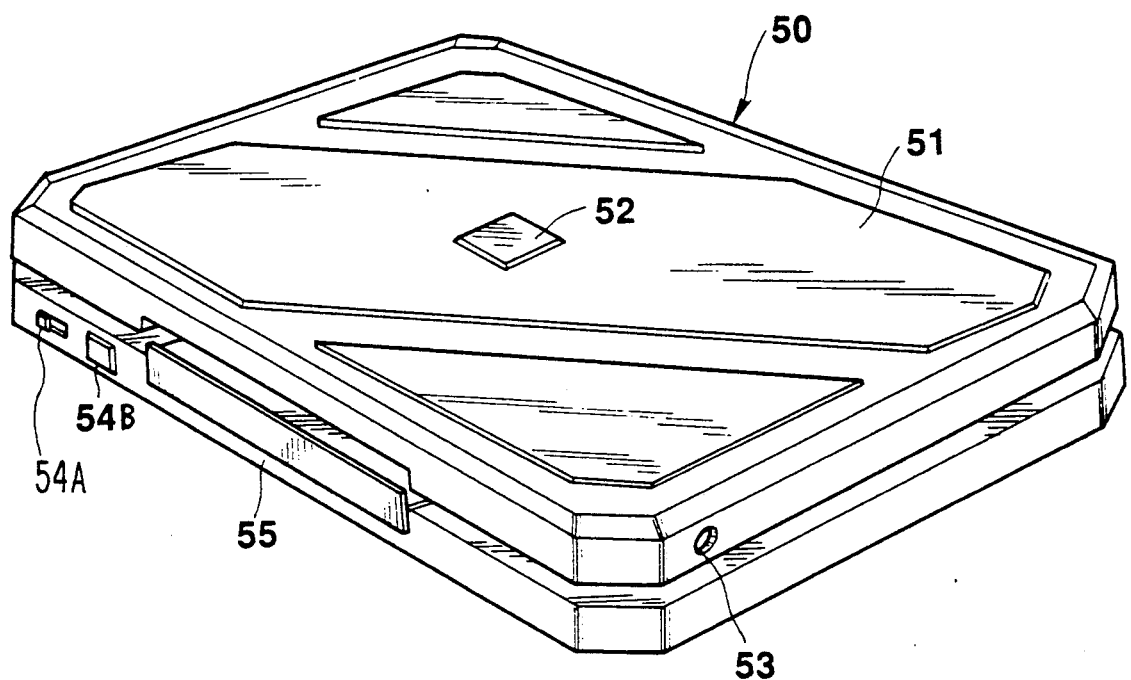
FIG. 8 is a perspective view showing the outer appearance of an electronic scale of a fee calculating apparatus according to a second embodiment of the present invention.

FIG. 8 is a perspective view showing an outer appearance of an electronic scale 50 for measuring the weight of a parcel.

The electronic scale 50 is a portable electronic scale incorporating a battery and having a thin box-like shape. The upper surface of the electronic scale 50 constitutes a parcel table 51. A parcel sensor 52 is attached to the central portion of the parcel table 51. The parcel sensor 52 is a pressure sensor for detecting that a parcel is placed thereon. When the parcel sensor 52 detects that a parcel is placed on it, a power supply voltage from the internal battery is applied to electronic components for measurement, i.e., the parcel sensor 52 controls power supply. The parcel sensor 52 serves to reduce power consumption by allowing power supply only while a parcel is positioned on the parcel table 51, thus realizing a portable electronic scale 50 using a battery as a power supply.

The electronic scale 50 incorporates a load cell amplifier, an A/D converter and the like, and serves to electronically measure the weight of a parcel. The measurement data is transmitted from a transmitting section 53 arranged on a side surface of the electronic scale 50. Note that a power switch 54A, a "0" correction switch 54B for clearing weight data, and a grip 55 are arranged on the side surface of the electronic scale 50.

Figure 9:
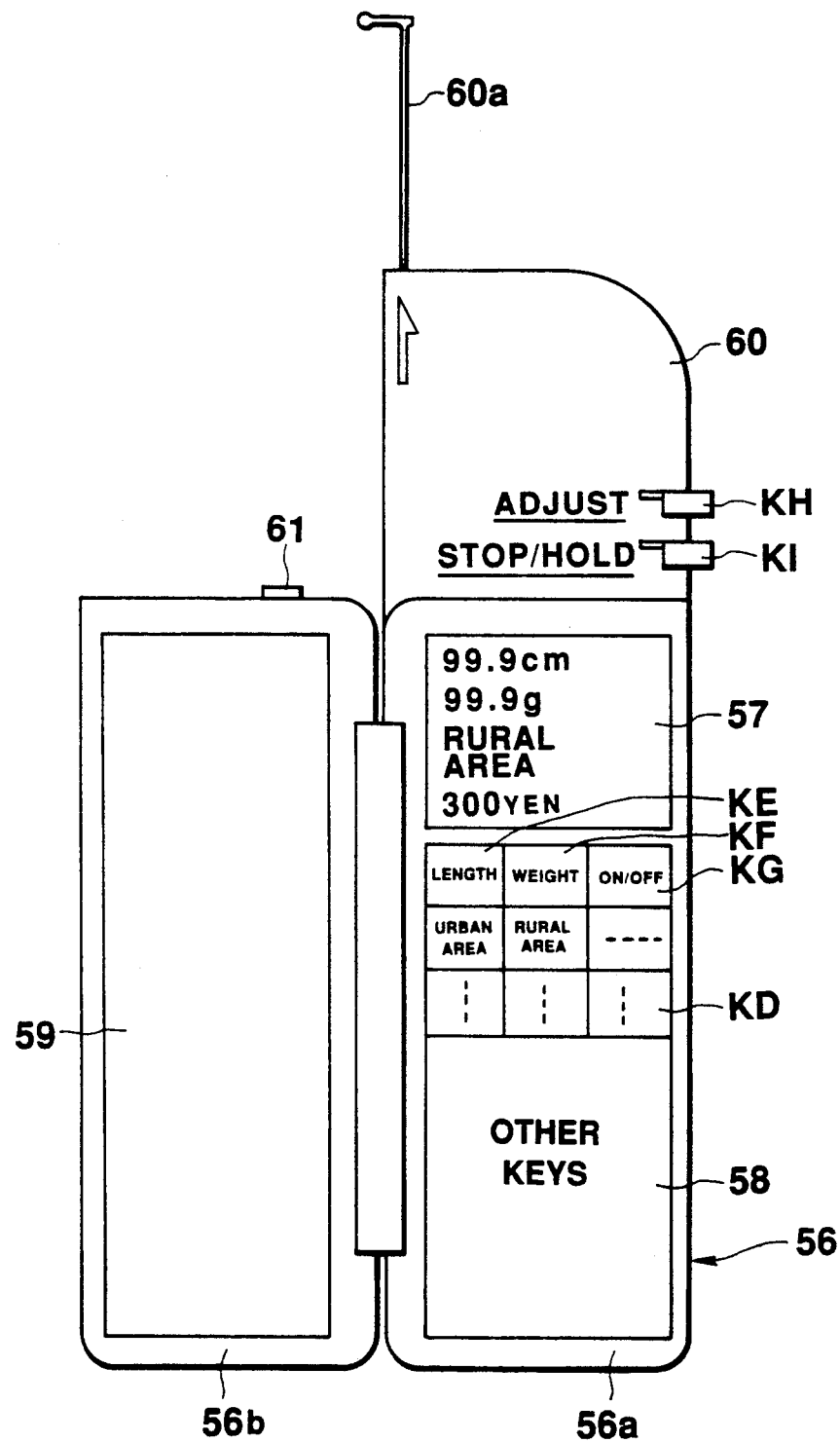
FIG. 9 is a view showing the outer appearance of a controller of the fee calculating apparatus according to the second embodiment.

FIG. 9 shows an outer appearance of a controller 56. The controller 56 is a handy type electronic device incorporating batteries and having an elongated booklike shape, as a whole, which can be opened.

FIG. 9 shows the open state of the controller 56. The controller 56 is constituted by upper and lower cases 56a and 56b which are coupled to each other so as to be openable. A display portion 57 for displaying fee data and the like, and a keyboard 58 having various keys are arranged on the upper surface of the inner case 56a. A guidance display portion 59 for displaying guidance data is arranged on the inner surface of the lower case 56b. In addition, an automatic measure section 60 is integrally formed with the upper portion of the upper case 56a, and a receiving section 61 is attached to the upper portion of the lower case 56b.

The keyboard 58 includes a number key for entering a length data, a length designation key KE for designating input of length data, a weight designation key KF for designating input of weight data, a power switch ON/OFF switch KG, a delivery area designation key KD, and the like.

The automatic measure section 60 incorporates a take-up mechanism for taking up a scale 60a, an optical detecting portion for automatically detecting the amount of the scale 60a protruding from the automatic measure section 60, and the like. In addition, an adjust key KH and a stop/hold key KI are arranged on a side portion of the automatic measure section 60.

Figure 10:
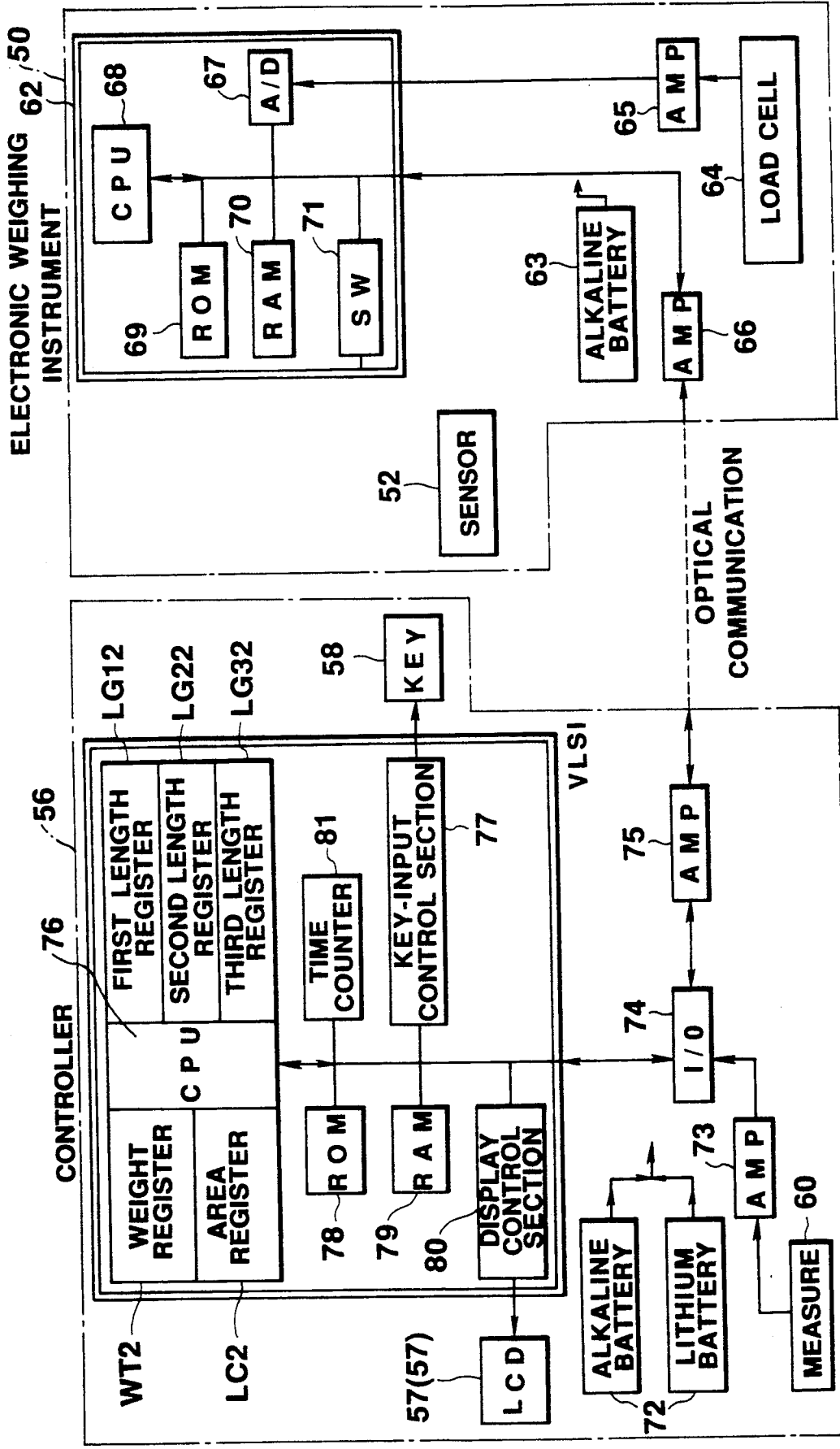
FIG. 10 is a block diagram of the electronic scale and the controller of the fee calculating apparatus according to the second embodiment.

FIG. 10 is a block diagram of the electronic scale and the controller 56.

The electronic scale 50 incorporates a one-chip LSI (large scale integrated circuit) 62, a battery (alkaline battery) 63, a load cell 64 and an amplifier 65 for measuring weight, and an amplifier 66 for optical communication, and is battery-driven so as to allow it to be portable.

An output voltage (weight measuring voltage) from the load cell 64 is amplified by the amplifier 65, and is converted into a digital value by an A/D converter 67 in the one-chip LSI 62. The digital value is then supplied to a CPU 68 in the one-chip LSI 62. The CPU 68 serves to control various operations of the electronic scale 50 in accordance with microprograms in a ROM 69. The CPU 68 causes a RAM 70 to store measurement data or reads out measurement data from the RAM 70 and supplies it as communication data to the amplifier 66. In addition, the CPU 68 receives a signal representing a switching state of a parcel switch 71 which is turned on/off in accordance with a detection output from the parcel sensor 52, and controls power supply from the battery 63 in accordance with the switching state.

The controller 56 is designed as follows.

The controller 56 uses batteries (lithium and alkaline batteries) as a power supply so as to improve its portability. A signal corresponding to a length measured by the automatic measure section 60 is amplified by an amplifier 73 and supplied to an input/output (I/O) circuit 74. In addition, a signal corresponding to weight data, transmitted as an optical signal from the electronic scale 50, is amplified by an amplifier 75 and supplied to the I/O circuit 74. Note that the I/O circuit 74 converts input signals respectively representing length and weight into digital values and supplies them to a CPU 76. A key-input signal from the keyboard 58 is converted into a key code by a key-input control section 77 and is received by the CPU 76.

The CPU 76 controls various operations of the controller 56 in accordance with microprograms stored in a ROM 78, and incorporates a weight register WT2, an area register LC2, and three types of length registers LG12, LG22, and LG32. In this case, the weight register WT2 is a register for temporarily storing weight data obtained by means of the electronic scale 50. The area register LC2 is a register for temporarily storing area data which is designated/input from the keyboard 58. The length registers LG12, LG22, and LG32 respectively store length data obtained by measurement by means of the automatic measure section 60 and sequentially store the lengths of three sides (height, width, and length) of a parcel measured by the automatic measure section 60. The CPU 76 reads out data from the weight register WT2, the area register LC2, and the length registers LG12, LG22, and LG32, calculates a delivery fee by referring to various tables in a RAM 79, and supplies the calculation result to a display control section 80 so as to display it on the display portion 57.

Note that a time counter 81 is arranged in the controller 56. The CPU 76 supplies date/time data obtained by the time counter 81 to the display control section 80, and causes the display portion 57 to display it, thereby enabling confirmation of the time and data of delivery.

A parcel rank conversion table (not shown), used for obtaining a parcel rank for inclusion in a fee calculation together with weight and length measurements, and which is similar to the parcel rank conversion table 42-1 in the first embodiment, is arranged in the RAM 79.

A fee conversion table (not shown), used for calculating the delivery fee on the basis of a rank obtained by conversion using the parcel rank conversion table and a designated/input delivery area, and which is similar to the fee conversion table 42-2 in the first embodiment, is arranged in the RAM 79.

In addition, a totalization memory, used for storing characters (area name), quantity, and net sales for each area, and which is similar to the totalization memory 42-3 in the first embodiment, is arranged in the RAM.

An operation of the fee calculating apparatus according to the second embodiment will be described below with reference to FIGS. 11 and 12.

Figure 11:
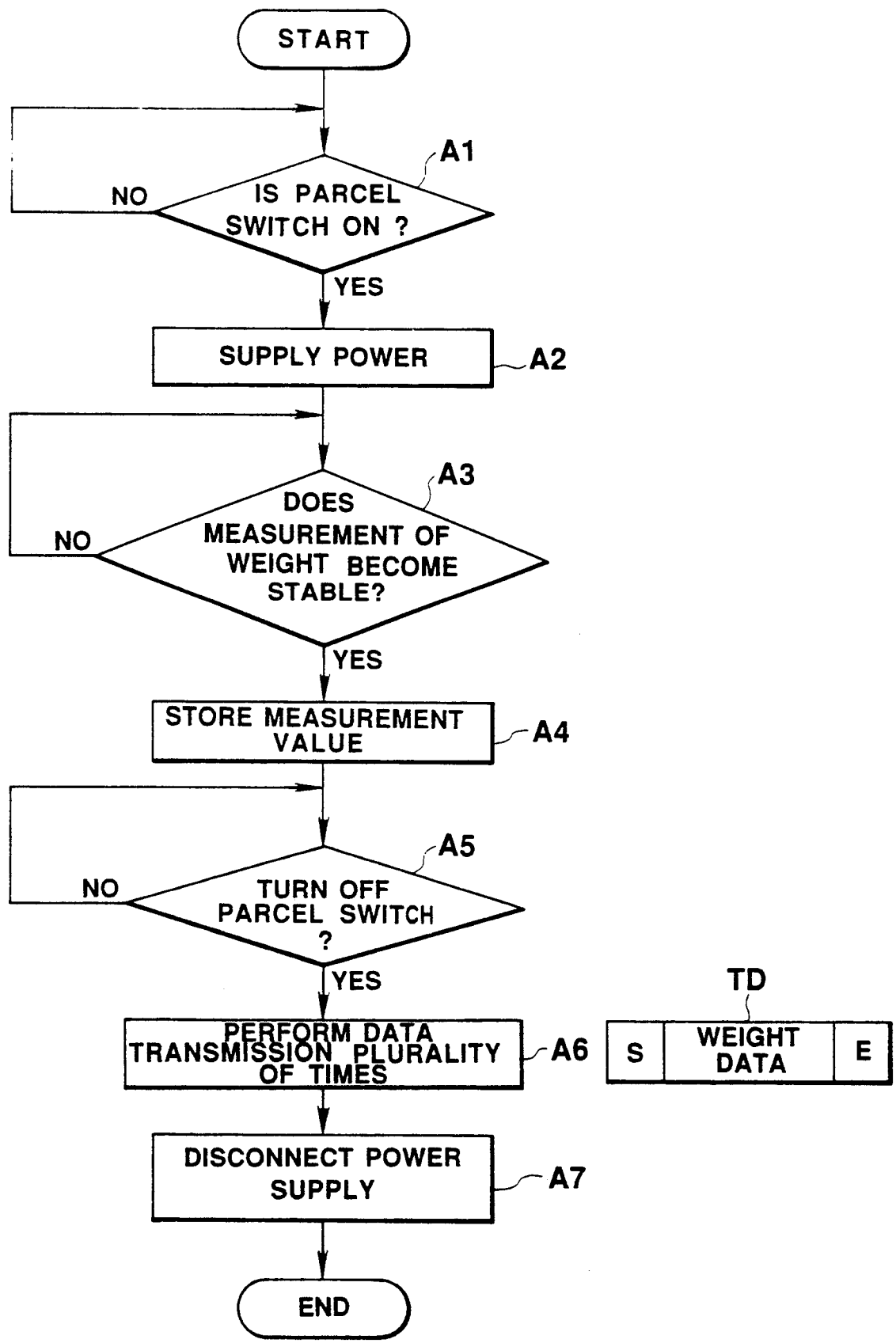
FIG. 11 is a flow chart showing an operation of the overall electronic scale of the fee calculating apparatus according to the second embodiment.

FIG. 11 is a flow chart showing an operation of the overall electronic scale 50.

When a parcel, as an object to be measured, is placed on the parcel table 51 of the electronic scale 50, the parcel is detected by the parcel sensor 52. As a result, the parcel switch 71 is activated (step A1), and a power supply voltage of the battery 63 is applied to the one-chip LSI 62 so as to turn it on (step A2). In this case, an output voltage from the load cell 64 is amplified by the amplifier 65 and applied to the A/C converter 67, to be converted into digital weight data. The data is then supplied to the CPU 68. In this case, the CPU 68 waits until the weight measurement becomes stable (step A3). When the weight measurement becomes stable, it is received by the CPU 68 and stored in the RAM 70 (step A4). When the parcel switch 71 is turned off (step A5), the CPU 68 reads out the measurement data (weight data) from the RAM 70, supplies it to the amplifier 66, and transmits it as an optical signal to the controller 56

(step A6). Note that in FIG. 11, reference symbol TD denotes transmission data; S, a start code; and E, an end code. Such transmission data is transmitted a number of times. After the weight data is transmitted a number of times in this manner, power supply to the one-chip LSI 62 is disconnected (step A7) so as to prevent unnecessary battery consumption. Each of steps A1, A3 and A5 produces a NO output to provide continuously recirculating operation thereof until a YES is produced.

Figure 12A:
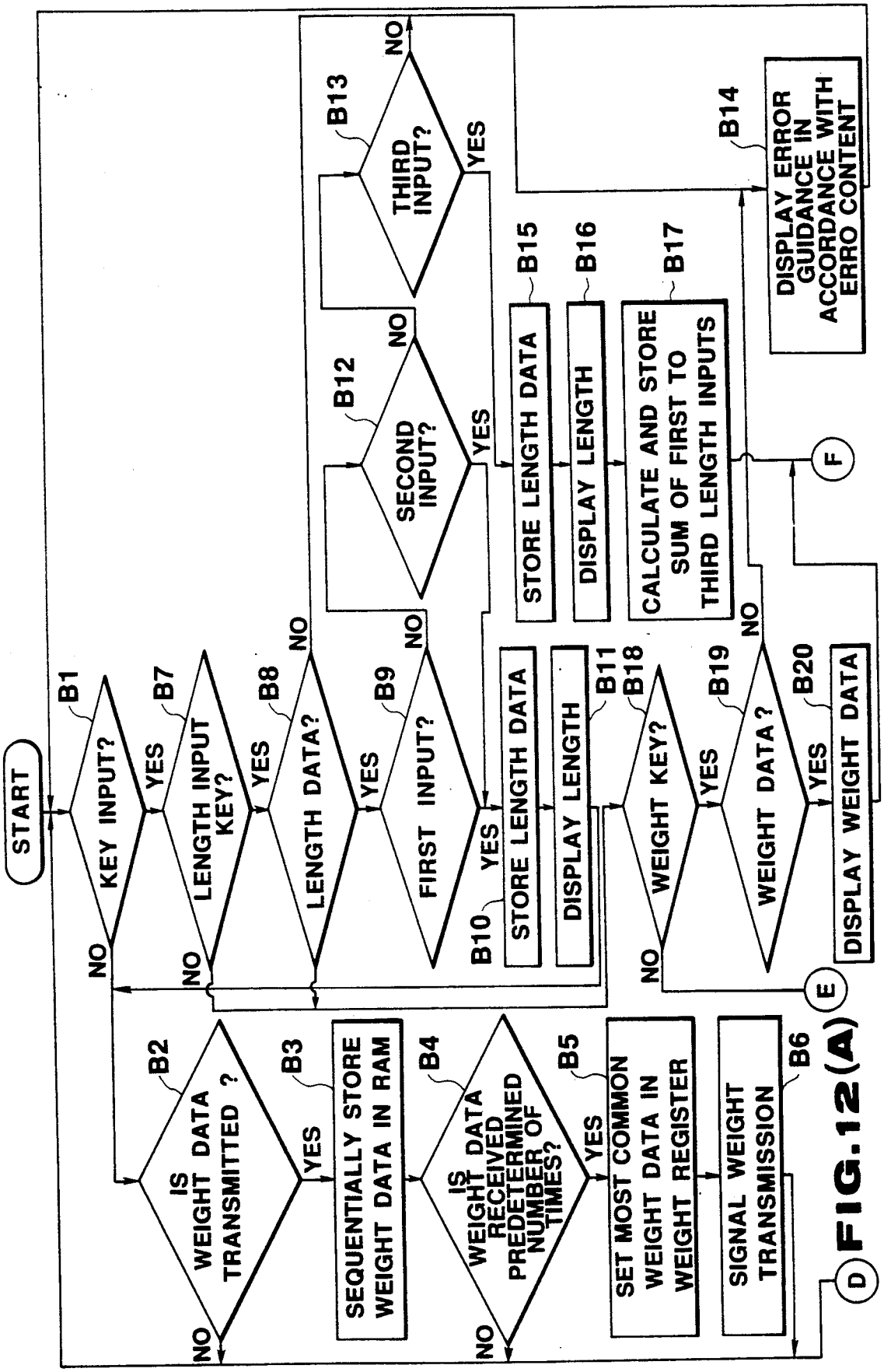
FIG. 12A and FIG. 12B are flow charts showing an operation of the overall controller of the fee calculating apparatus according to the second embodiment.
Figure 12B:
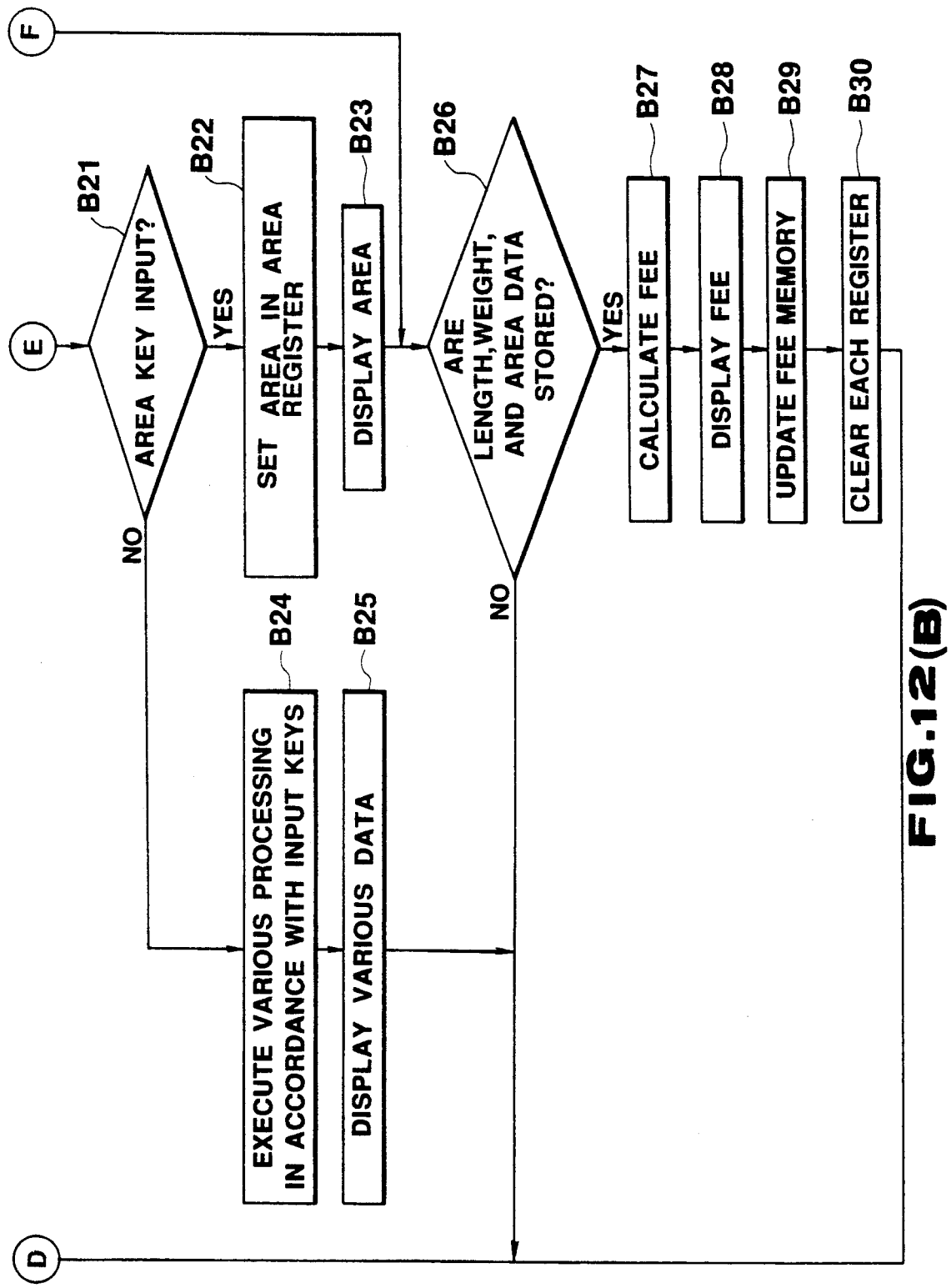

FIGS. 12(A) and 12(B) are flow charts showing an operation of the overall controller 56.

When the power supply is turned on, the CPU 76 executes an operation in accordance with the flow chart shown in FIGS. 12A and 12B.

The CPU 76 stands by until a key input is supplied from the keyboard 58 (step B1) or weight data is transmitted from the electronic scale 50 (step B2).

Upon reception of weight data from the electronic scale 50, the CPU 76 causes the RAM 79 to store the weight data (step B3). The CPU 76 then checks whether weight data is received a predetermined number of times (step B4). If weight data is received not more than the predetermined number of times, the operation returns to step B1. If weight data which is transmitted from the electronic scale 50 a plurality of times is properly received, the operation advances to step B5 to detect the average weight data of the weight data in the RAM 79, corresponding to the predetermined number of receiving operations, and writes it in the weight register WT2, after which the CPU 76 reports that the weight data transmitted from the electronic scale 50 has been properly received (step B6).

If the operator confirms this and operates the weight designation key KF, the presence of a key input is detected in step B1, and the operation/programme advances to step B7. Since the weight designation key KF is operated in this case, this operation is detected in step B18, and the operation advances to step B19 to cause the display portion 57 to display the weight data, provided that the weight data is stored in the weight register WT2 (step B20).

Subsequently, the operation advances to step B26, where it is checked whether predetermined data is stored in the weight register WT2, the area register LC2, and the length registers LG12, LG22, and LG32, i.e., whether all the data required to calculate a delivery fee has been obtained. In this case, since only the weight data is available, the flow keeps returning to step B1 until all the required data is obtained.

If the scale 60a of the automatic measure section 60 is pulled out to measure the length of the parcel, a length corresponding to the amount of the scale 60a protruding from the automatic measure section 60 is detected by the automatic measure section 60, and the detection output is supplied to the CPU 76 through the amplifier 73 and the I/O circuit 74. To initiate this process, the operator operates the length designation key KE. The operation is then detected in step B7, and the flow advances to step B8 to check the presence/absence of input length data. If only the length designation key KE is operated without performing a measurement of length, an error guidance is displayed to indicate this operation error (step B14). If the presence of input length data is detected, step B8 produces a YES output, and the number of input operations is checked (step B9, B12, and B13). If the first input operation is determined in step B9, the corresponding data is stored in the length register LG12, per steps B10. Similarly, the data corresponding to the second and third input operations per step B12 and step B13 is sequentially stored in the length registers LG22 and LG32 respectively (steps B10 and B15), and the length data is displayed on the display portion 57 (steps B11 and B16). Specifically, if step B12 produces a YES, this reflects occurrence of the second input. If step B12 produces a NO, the flow proceeds to step B13 which produces a YES to indicate occurrence of the third input. If the signal is not the third input, step B13 produces a NO which leads to step B14 (see below).

If the lengths of the three sides of the parcel are measured, and the measurement values are respectively set in the length registers LG12, LG22, and LG32 in this manner, the sum of the lengths of the three sides is calculated on the basis of these measurement values, and the calculation result is stored in the RAM 79 (step B17).

If the area designation key KD is operated (step B21), area data corresponding to the operated area designation key KD is stored in the area register LC2 (step B22), and is displayed on the display portion 57 (step B23).

Note that if length data is input four times or more (NO in step B13) or the weight designation key KF is operated without receiving weight data from the electronic scale 50 (NO in step B19), an error signal corresponding to an error content is displayed in step B14. In addition, if keys other than the length, weight, and area designation keys KE, KF, and KD are operated, various processes corresponding to the input keys are executed (step B24), and the processing results are displayed on the display portion 57 (step B25).

If all the weight, length, and area data required to calculate a delivery fee is input/stored in the above-described manner, this state is detected in step B26, and the flow advances to step B27 to calculate the delivery fee.

In this case, the delivery fee is calculated by referring to the parcel rank conversion table and the fee conversion table (not shown) stored in the RAM 79. More specifically, retrieval of the parcel rank conversion table is performed on the basis of the weight data in the weight register WT2 and the length data (the sum of the lengths of the three sides) in the RAM 79, so as to obtain the rank of the parcel based on the weight and length (size) thereof. Thereafter, the fee conversion table (not shown) is retrieved in accordance with this parcel rank and the area data in the area register LC2, so as to obtain the delivery fee.

When the delivery fee is calculated in this manner, the calculated fee is displayed on the display portion 57 (step B28). The totalization memory (not shown) is retrieved in accordance with the area data, and the quantity and the net sales in the totalization memory corresponding to the area name are updated (step B29). The respective registers in the CPU 76 are cleared (step B30), the flow returns to step B1, and the same operation as described above is subsequently repeated.

In this embodiment, since the electronic scale is separated from the controller, length and weight can be simultaneously measured, which further improves the operating efficiency.

In the above-described embodiments, the length and weight designation keys are operated. However, weight and length measurements may be automatically input and stored without key operations. In this case, data may be automatically stored after the lapse of a predetermined time, i.e., after each measuring instrument is stabilized.

Furthermore, in the above embodiments, the amount of the scale of the automatic measure section protruding therefrom is optically detected. However, it may be detected magnetically or by using laser beams or the like.

What is claimed is:

1. A fee calculating apparatus for calculating a delivery fee of a parcel in accordance with weight, length, and delivery area of the parcel, comprising:
    a weight measuring section for measuring the weight of the parcel;
    a length measuring section for measuring the length of the parcel;
    area data input means for inputting area data representing the delivery area of the parcel;
    a fee table for storing delivery fees corresponding to weight, lengths, and areas; and
    calculating means for, when weight data obtained by measurement in said weight measuring section, length data obtained by measurement in said length measuring section, and the area data input by said area input means are all received, obtaining the delivery fee from said fee table by using the received data;
    wherein said fee table comprises a parcel rank conversion table and a fee conversion table, parcel ranks corresponding to weight and length combinations being pre-stored in said parcel rank conversion table, and delivery fees corresponding to combinations of said parcel ranks and said delivery areas being pre-stored in said fee conversion table; and
    wherein said calculating means obtains from said parcel rank conversion table one of said parcel ranks on the basis of the weight and length data for said parcel from said weight and length measuring sections, and obtains from said fee conversion table one of said delivery fees in accordance with said one parcel rank and the area input from said area input means.

2. An apparatus according to claim 1, further comprising memory means for storing three types of length data, and operating means for, when the three types of memory means data are respectively set in said length, obtaining the size of said parcel by calculating the sum of the three types of length data.

3. A fee calculating apparatus for calculating the delivery fee of a parcel in accordance with the weight, length and delivery area of the parcel, comprising:
    a weighing device having a weight measuring means for measuring the weight of a parcel and a wireless transmitting means for transmitting weight data obtained by the weighing device;
    an electronic device including a weight data receiving means for receiving the weight data transmitted by said wireless transmitting means; an area data input means for inputting area data representing a delivery area of the parcel; a fee table for storing delivery fees corresponding to weights, lengths and delivery areas; and a calculating means for, when the weight data received by said receiving means, length data obtained by measurement in a length measuring section and area data input from said area input means are all received, obtaining a delivery fee from said fee table by using the received data;
    wherein said fee table comprises a parcel rank conversion table and a fee conversion table, parcel ranks corresponding to weight and length combinations being pre-stored in said parcel rank conversion table, and delivery fees corresponding to combinations of said parcel ranks and said delivery areas being pre-stored in said fee conversion table; and
    wherein said calculating means obtains from said parcel rank conversion table one of said parcel ranks on the basis of the weight and length data for said parcel from said weight and length measuring sections, and obtains from said fee conversion table one of said delivery fees in accordance with said one parcel rank and the area data input from said area input means.

4. An apparatus according to claim 3, wherein said weight measuring instrument further comprises transmitting means for transmitting weight data obtained by measurement a plurality of times, and said comprises discriminating means for discriminating the average of the weight data received the plurality of times.

5. An apparatus according to claim 3, wherein said electronic device further comprises length registers for storing three types of length data, and operating means for, when the three types of length data are respectively set in said length registers, obtaining the size of the parcel by calculating the sum of the three types of length data.

6. An apparatus according to claim 3, wherein said weight measuring instrument has a parcel sensor means for detecting that the parcel is placed thereon, so as to apply a power supply voltage upon detection of the parcel.

7. An apparatus according to claim 6, wherein said weight measuring instrument comprises disconnecting means for disconnecting the supply of power from a power supply after the weight data is transmitted.

* * * * *